UNITED STATES PATENT OFFICE 2,464,062

POLYMERIZATION WITH A PEROXYDICARBONATE CATALYST

Franklin Strain, Norton Center, Ohio, assignor to Pittsburgh Plate Glass Co., a corporation of Pennsylvania No Drawing. Application November 26, 1947, Serial No. 788,309

12 Claims. (Cl. 260—80)

This invention relates to the polymerization of polymerizable unsaturated compounds which contain the non-aromatic polymerizable group

and to novel compositions containing such compounds. It is known that a wide group of compounds containing this group polymerize when heated in the presence of a soluble peroxide polymerization catalyst such as benzoyl peroxide, lauroyl peroxide, acetone peroxide, etc. Most of the unsaturated compounds of this type contain one or more activating groups which are linked directly to the unsaturated group. Typical of the groups which appear to activate polymerization when so linked are

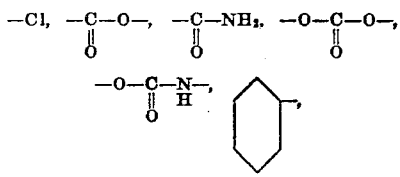

etc.

In general, it has been found that peroxide catalysts are capable of activating polymerization primarily at an elevated temperature well above room temperature. The exact temperature at which any catalyst will activate polymerization depends to a very large degree upon the activity of the catalyst and the unsaturated compound. For example benzoyl peroxide will cause polymerization of easily polymerizable materials at 50–60° C. On the other hand, less easily polymerizable materials such as allyl phthalate or similar allyl polycarboxylic acid ester requires temperatures of 65 to 80° C. in order to achieve polymerization at a reasonably rapid rate. Acetone peroxide is effective only at temperatures which are much higher. In any event, polymerization processes using peroxide catalysts normally have been found to require some heating.

Not infrequently, the requirement of an elevated temperature for polymerization is disadvantageous. For example, when relatively thick cast polymers are to be prepared, serious difficulty may be encountered in controlling polymerization. It will be understood that, during polymerization of an unsaturated compound, energy is released in the form of heat. This evolved heat, unless removed, tends to cause elevation of temperature with consequent increase in the rate of polymerization and evolution of more heat. This problem can become so acute as to cause the polymerization to get out of control and cause formation of polymers having cracks, bubbles, poor color or other defects.

Especially difficult is the production of relatively thick cast polymers having thicknesses for example in excess of ¼ inch. Since the polymerizable materials generally are poor heat conductors, heat evolved in a central area of the casting cell can be removed only at a very slow rate. Consequently too rapid polymerization with its attendent too rapid evolution of heat can occur more easily in the production of such thick castings and, therefore, control of such polymerization is quite difficult.

In accordance with the present invention, I have found that polymerization of unsaturated compounds which are polymerizable in the presence of peroxides, may be polymerized at temperatures which are substantially lower, usually at least 15 to 30° C. lower than is required with other peroxides, by conducting the polymerization in the presence of a catalytic amount of an organic peroxy dicarbonate, such as described hereinafter. I have discovered that whereas polymerization of allyl esters of dicarboxylic acids in the presence of benzoyl peroxide requires a temperature of at least about 65–70° C., such polymerization may be initiated below 60° C. usually at 20 to 45° C. using the organic peroxydicarbonates herein contemplated. Furthermore polymerization may be allowed to proceed more rapidly since the lower temperature permits more rapid removal of heat of polymerization and simpler methods of control. Liquid or low-melting peroxydicarbonates have been found to be especially valuable in connection with this invention because of the ease of incorporation of such agents into polymerizable materials.

The use of the lower temperature eliminates the requirement for elaborate oven construction and enables polymerization in thermostatically controlled rooms in which men may work without discomfort or inconvenience. Furthermore, products which are more free from color and other defects are obtained and the danger of the polymerization process getting out of control is materially reduced.

The organic peroxydicarbonates herein contemplated appear to have the general structure

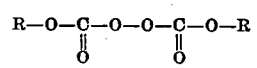

where R is an organic radical of a hydroxy compound ROH. These compounds may be prepared by reacting aqueous solutions of sodium peroxide with monohaloformates in accordance with the following reaction:

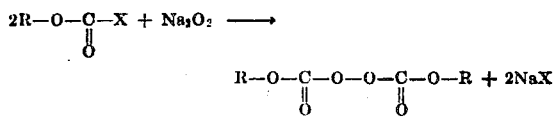

The reaction is conducted at low temperatures, for example, below +10° C., by adding the peroxide solution to the chloroformate while agitating the reaction mass vigorously and cooling on an ice bath. The percarbonates herein used and the methods of their preparation are described and claimed in application for United States Patent Serial No. 463,005 filed by me on October 22, 1942, now Patent No. 2,370,588 issued February 27, 1945, of which application this is a continuation-in-part.

Suitable peroxydicarbonate esters which may be used according to this invention are the peroxydicarbonates of monohydric alcohols containing less than about 18 carbon atoms. Of especial interest from the standpoint of catalyzing polymerization at low temperature are the alkyl peroxy dicarbonates derived from alcohols containing up to about 18 carbon atoms such as the methyl, ethyl, isopropyl, n-propyl, isobutyl, n-butyl, lauryl, amyl, and hexyl peroxydicarbonates, and the corresponding aliphatic unsaturated peroxydicarbonates, such as the allyl, methallyl, crotyl, vinyl, propargyl, or 2-chloroallyl peroxydicarbonates. Araliphatic, heterocyclic, aromatic and cycloaliphatic derivatives, such as benzyl, cyclohexyl, tetrahydrofurfuryl or cinnamyl peroxydicarbonates also may be used according to this invention. Moreover more complex peroxydicarbonates such as the products derived by reaction of the chloroformates of monohydroxy acids or their esters (ethyl lactate, ethyl glycollate, ethyl salicylate, methyl lactate, etc.) with sodium peroxide, may be used as herein contemplated. Also contemplated are the polymeric peroxydicarbonates obtained by reacting ethylene glycol dichloroformate or diethylene glycol dichloroformate or dichloroformate of an equivalent glycol or polyglycol with sodium peroxide and such other peroxydicarbonates as may be described or suggested in the above U. S. patent.

The peroxydicarbonate esters are usually water insoluble liquids but sometimes are white crystalline solids. They are usually soluble in the polymerizable monomers at or below the temperature of polymerization. The percarbonate esters, and particularly the liquid esters, slowly decompose at normal room temperatures and may at slightly higher temperatures decompose spontaneously, sometimes with explosive violence. Since the decomposition reaction is exothermic, the heat generated by slow decomposition at normal room temperature may cause an elevation of the temperature within the mass and induce an explosive decomposition. Accordingly, the percarbonates should be refrigerated or otherwise stabilized prior to use. The stabilization may be effected by cooling to 0° C. or lower by suitable cooling mediums, for example solid carbon dioxide. The stabilization may be effected also by dissolving up to one percent of iodine in the liquid percarbonate and washing the iodine out just prior to the use.

My method of polymerization is capable of wide application to polymerize unsaturated compounds which polymerize under peroxide catalysis. Typical compounds which may be polymerized are those which contain the vinyl group

or substituted vinyl group such as acrylamide, acrylonitrile, styrene, halo styrenes, vinyl chloride, vinylidene chloride, vinyl bromide, vinyl methyl ketone, divinyl ether, methacrylonitrile, methacrylamide, N-substituted methacrylamides, maleimide, etc. My invention has been found to be particularly useful in the polymerization of unsaturated esters which contain an olefinic bond attached to the second carbon atom from an ester linkage including the vinyl esters, the allyl and methallyl esters and esters containing two or more groups such as vinyl, allyl, substituted allyl, acrylate, substituted acrylate, fumarate, maleate and the substituted a,a'-unsaturated dicarboxylic acid groups. These compounds belong to a general class of esters having at least one olefinic bond which is attached to the second carbon atom from an ester linkage. By "ester linkage" I mean a

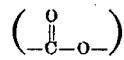

group, having an oxygen atom adjacent a carbonyl radical. Thus, a carbonate

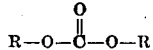

has each radical R adjacent an ester linkage. The ester linkage may be in either position. Thus, the compounds which are capable of being polymerized in accordance with this invention include those represented by the following general formulae:

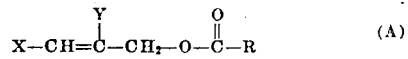 (A)

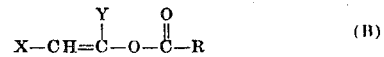 (B)

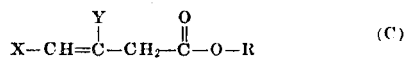 (C)

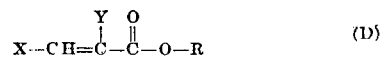 (D)

wherein R may be any organic radical and X and Y may be hydrogen, halogen, or hydrocarbon radical.

Of these the vinyl esters and the acrylate esters, types (B) and (D) respectively, are known as the very active polymerizable esters. Types (A) and (C), the allyl esters and the crotonate esters, are known as the moderately active polymerizable esters. Although the X and Y substituents will have some effect on the polymerizability of the esters, in general the compounds will be polymerizable in the presence of percarbonate catalyst. The esters of maleic and fumaric acid belong to type (D) wherein X is a carboxylic acid ester radical and Y is a hydrogen atom.

Typical compounds of the above types which may be polymerized according to this invention are: diallyl phthalate, diallyl oxalate, diallyl maleate, diallyl fumarate, diallyl adipate, diallyl azelate, and the corresponding methallyl, 2-chloroallyl, n-propargyl esters, allyl acrylate, methyl acrylate, methallyl acrylate, methyl methacrylate, ethyl methacrylate, methyl alpha chloroacrylate, ethylene dimethacrylate, diethylene glycol dimethacrylate, allyl methacrylate, vinyl acetate, vinyl chloride, styrene, vinylidene chloride, vinyl fluoride, butadienyl acrylate, methyl maleate, methyl fumarate, ethylene glycol maleate, fumarate or itaconate, propylene glycol maleate, fumarate or itaconate or the corresponding polyethylene or polypropylene glycol maleates, fumarates or itaconates, etc.

The quantity of peroxy dicarbonates used to effect the desired polymerization depends largely upon the activity of the polymerizable compound. The very active polymerizable materials such as methyl methacrylate, vinyl acetate, glycol dimethacrylate, etc. require but small amounts usually of the order of 0.05 to 0.50 percent of peroxy dicarbonate by weight based upon the weight of the ester. Other less active esters such as diallyl phthalate, diallyl adipate, diethylene glycol bis (allyl carbonate) require more peroxydicarbonates and concentrations up to about 5 percent thereof by weight normally are used in order to develop maximum hardness. Higher concentrations are used under special circumstances. For example, weakly polymerizable materials such as allyl crotonate may require such higher concentrations. Moreover polymerization of mixtures of polymerizable esters and fillers such as alpha cellulose floc, paper, titanium dioxide, etc. often require higher catalyst concentrations than normal due to the tendency of the filler to absorb, react with or hinder the action of the catalyst. It is rare that the catalyst concentration will be above about 10 percent by weight based upon the weight of polymerizable compound.

The temperature at which the polymerization should be conducted depends upon the nature and activity of the material to be polymerized. A particularly advantageous feature of this invention resides in the fact that the catalysts herein contemplated will cause polymerization to initiate at temperatures lower (usually 25–30° C. lower) than the temperatures at which other catalysts are operative. Such lower temperatures are advantageous since they eliminate the requirement for special oven equipment. Usually in the polymerization of liquid monomers or partially polymerized syrups, the initial polymerization temperature is maintained below 60° C. and the temperature is not allowed to raise above 60° C. until the liquid has become solid and polymerization has been at least 50 to 75% completed. After a solid polymer has been obtained it is frequently desirable to increase the rate of polymerization by increasing the temperature. Consequently in the later polymerization stages when danger of impairment of the polymer due to too rapid polymerization has decreased for example in the last 25 to 50 per cent thereof the temperature frequently is raised usually in a gradually rising cycle to a final curing temperature of about 80 to 125° C.

For most purposes it is found desirable to introduce some heat into the polymerizable compound-catalyst mixture in order to expedite polymerization and to avoid the delay of a long polymerization induction period. Consequently, the initial polymerization (at least the first 25–75% thereof) is generally conducted within the range of 25 to 60° C. until the polymer has become solid.

Where large castings are to be produced or where extremely active materials are undergoing polymerization lower temperatures may be used. For example, in the polymerization of castings of one or several inches in thickness, removal of heat of polymerization frequently is too slow and shrinkage of the casting often is too fast at the temperature range of 25 to 60° C. In such a case lower temperatures sometimes as low as about 0° C. or even somewhat lower are used.

The method of my invention is especially useful in the preparation of transparent cast shapes. Generally, irregular shapes are very difficult to prepare due to the shrinkage of the resin during polymerization. Such irregular shapes must be prepared at very low temperatures and with very slowly increased temperatures or at constant temperatures. The method is particularly useful in preparing regular shapes such as sheets, tubes, etc.

The casting operation is preferably conducted with thickened or partially polymerized liquid polymerizable compound, thus reducing contraction while within the mold. For the same reason, the cast polymer may be removed from the mold as soon as it is strong enough to withstand the handling operations necessary in the removing of the mold.

In the preparation of flat sheets a mold may be constructed from two sheets of tempered plate glass provided with a gasket, or edge retainer, of synthetic rubber or other elastic material. The edges of the glass sheets are held firmly in contact with the gasket by the use of suitable adjustable clamps or spring clamps. The assembled mold is then filled with the polymerizable ester containing sufficient catalyst to produce the desired polymerization. The polymerizable compound is first heated if necessary to induce polymerization to the point where substantial polymerization has occurred without the loss of the necessary fluidity to enable the filling of the mold without the entrapment of air bubbles. The filled mold is then sealed and heated for sufficient time to induce the polymerization to a hard resin.

My invention is also useful in the preparation of resin impregnated fabric compositions by methods well known to the resin art. In accordance with this method a liquid polymerizable compound with catalyst incorporated may be sprayed, painted, or otherwise applied to a preformed fabric shape and the impregnated product polymerized. Alternatively, or the unformed fabric may be impregnated with the liquid compound and then formed to the desired shape before polymerization. Other uses as coating compositions or adhesives will be apparent to one skilled in the art.

Partial polymers such as the soluble fusible polymers described in United States Letters Patent No. 2,306,139 or insoluble fusible polymers such as described in United States Letters Patent No. 2,403,112 also may be polymerized using the catalysts herein contemplated.

The following examples are illustrative:

*Example I*

A glass tube 1 inch in internal diameter and 12 inches long was coated on the inside with polymerized isobutylene by filling with a 5 percent solution of polyisobutylene in benzene. The tube was closed at one end and filled with monomeric diethylene glycol bis (allyl carbonate) containing 3.5 percent of isopropyl peroxydicarbonate.

The filled mold was heated in a water bath at 45° C. for 72 hours and then at 90° C. for 3 hours. The polymer was forced out of the mold with a hand press. A clear transparent rod of hard solid polymer was obtained.

*Example II*

A mold was prepared using two 12 inch squares of ⅜ inch transparent plate glass. A strip of plasticized polyvinyl acetate of ¼ inch square cross section was inserted between the edges in such manner as to form a closed mold. Diallyl phthalate containing 3 percent of ethyl peroxydicarbonate was heated at 40° C. until a 500 percent increase in viscosity was noticed. The thus thickened monomer was poured into the prepared mold through an opening in the gasket. When the mold was filled it was permitted to stand until all air bubbles were released. The mold was then closed and placed in an oven at 44° C. The oven temperature was gradually raised in accordance with the following cycle:

| Temperature ° C. | Elapsed Time |
|---|---|
| | Hrs. Minutes |
| 44 | 0:00 |
| 45 | 1:00 |
| 46 | 2:00 |
| 48 | 3:50 |
| 50 | 5:30 |
| 52 | 7:00 |
| 54 | 8:20 |
| 56 | 9:20 |
| 58 | 10:10 |
| 60 | 10:50 |
| 65 | 12:20 |
| 70 | 14:00 |
| 75 | 15:00 |
| 80 | 15:40 |
| 85 | 16:10 |
| 90 | 16:30 |
| 105 | 17:00 Out |

When the mold was removed from the oven and opened, a sheet of transparent hard polymer was obtained.

Example III

Methyl methacrylate containing 0.1 percent of isopropyl peroxydicarbonate was poured into a disk shaped mold one inch in diameter and ¼ inch thick. The mold was maintained at a temperature of 25° C. for 48 hours. A hard transparent polymer was thereby prepared.

Example IV

Glycol dimethacrylate was cast in a small mold in the presence of 0.1 percent of isopropyl percarbonate. A hard polymer was obtained in 72 hours at 25° C.

Example V

Vinyl acetate was mixed with 0.05 percent of ethyl percarbonate. A hard resin was obtained by heating in a water bath at 25° C. for 72 hours.

Example VI

A quantity of allyl methacrylate was washed three times with distilled water and dried thereafter with sodium sulphate. A small test tube 3 inches long and about ⅜ inch in diameter was partially filled with the purified allyl methacrylate, containing 2 percent by weight of isopropyl peroxydicarbonate, and the test tube was placed in a refrigerator at 9° C. After standing for four days polymerization had occurred to the point where an insoluble brittle gel had been formed. This gel was hardened by heating at 70° C. for thirty minutes.

Example VII

The process of Example VI was repeated, using a mixture containing 50% by weight of allyl methacrylate and 50% by weight of methyl methacrylate and 1% by weight of isopropyl peroxydicarbonate based upon the total weight of both methacrylates. After 4 days standing at 9° C., a tough thermoplastic polymer was obtained. This polymer was pressed to flatten it and the flat bottom was heated at 70° C. for 30 minutes whereupon a flat, clear, hard infusible polymer was obtained.

Example VIII

Allyl benzoate containing 2% by weight of benzyl peroxydicarbonate based upon the weight of the benzoate was heated at 50° C. for 72 hours and a viscous fluid polymer was obtained.

Example IX

One percent by weight of isopropyl peroxydicarbonate based upon the weight of the styrene was dissolved in freshly distilled monomeric styrene and the mixture was heated for 50 hours at 45° C. A colorless clear casting of solid polystyrene was obtained.

Example X 50 grams of vinyl chloride containing 1.5 grams of isopropyl peroxydicarbonate was allowed to reflux for 5 hours at the boiling point of vinyl chloride. A small amount of polymer was obtained.

At higher temperatures and under pressure a larger polymer yield may be obtained. However at 25° C. the polymerization of this mixture occurs explosively. Diluents such as styrene or vinyl acetate may be added and in such a case copolymerization at 25° C. occurs at a more moderate rate.

Example XI

Allyl fluoride containing 5.9 percent by weight of isopropyl peroxydicarbonate, based upon the weight of allyl fluoride, polymerized when heated for 64 hours at 45° C. The resultant product was a viscous liquid which contained about 65% of polymerized allyl fluoride.

This application is a continuation in part of my applications Serial No. 463,005, filed October 22, 1942, and 527,488, filed March 21, 1944, now abandoned.

Although the present invention has been described with particular reference to the specific details of certain embodiments, it is not intended that such details shall be regarded as limitations upon the scope of the invention except insofar as included in the accompanying claims.

I claim:

1. A method of preparing a polymer of a polymerizable, monomeric, unsaturated ester, having an olefinic bond attached to the second carbon atom from an ester linkage therein which comprises polymerizing the monomer in the presence of a catalytic amount up to 10 percent of an alkyl peroxydicarbonate at a temperature between 0° C. and 60° C. until a solid polymer is formed.

2. A method of preparing a polymer of a polymerizable monomeric, unsaturated ester having an olefinic bond attached to the second carbon atom from an ester linkage therein which comprises polymerizing the monomer in the presence of a catalytic amount up to 10 percent of isopropyl peroxydicarbonate at a temperature between 0° C. and 60° C. until a solid polymer is formed.

3. A method of preparing a polymer of a polymerizable, monomeric, unsaturated ester having an olefinic bond attached to the second carbon atom from an ester linkage therein, which method comprises dissolving a catalytic amount up to 10 percent of ethyl peroxydicarbonate in the monomeric ester and polymerizing the mixture at a temperature between 0° C. and 60° C. until a solid polymer is formed.

4. A method of preparing a polymer of a polymerizable, monomeric, unsaturated ester having an olefinic bond attached to the second carbon atom from an ester linkage therein, which method comprises dissolving a catalytic amount up to 10 percent of an alkyl peroxydicarbonate in the monomeric ester, polymerizing at a temperature between 0° C. and 60° C. until the polymerization is substantially 50 percent complete and subsequently completing the polymerization by heating at a temperature above 60° C.

5. A method of polymerization which comprises heating a liquid polymerizable unsaturated ester having an olefinic bond attached to the second carbon atom from an ester linkage which comprises polymerizing the ester in the presence of a catalytic amount up to 10 percent of an aliphatic peroxydicarbonate at a temperature of 0 to 60° C. until a solid polymer is formed.

6. A method of polymerization which comprises heating a liquid polymerizable unsaturated ester having an olefinic bond attached to the second carbon atom from an ester linkage which comprises polymerizing the ester in the presence of a catalytic amount up to 10 percent of an aliphatic peroxydicarbonate at a temperature of 0 to 60° C.

7. In the preparation of a polymer by catalytic polymerization of a polymerizable compound which contains the nonaromatic polymerizable group

which is polymerizable by peroxy compounds, the step which comprises conducting polymerization of said compound in the presence of a peroxydicarbonate ester.

8. In the preparation of a polymer by catalytic polymerization of a polymerizable compound which contains the nonaromatic polymerizable group

which is polymerizable by peroxy compounds, the step which comprises conducting polymerization of said compound in the presence of a peroxydicarbonate ester at a temperature of 0 to 60° C.

9. In the preparation of a polymer by catalytic polymerization of a polymerizable compound which contains the nonaromatic polymerizable group

which is polymerizable by peroxy compounds, the step which comprises conducting the polymerization of said compound in the presence of a liquid peroxydicarbonate ester at a temperature below 60° C. until a solid polymer is formed.

10. In the preparation of a polymer by catalytic polymerization of a polymerizable compound which contains the nonaromatic polymerizable group

which is polymerizable by peroxy compounds, the step which comprises conducting the polymerization of said compound in the presence of a catalytic amount up to 10% of an organic peroxydicarbonate ester.

11. In the preparation of a polymer by catalytic polymerization of a polymerizable compound which contains the nonaromatic polymerizable group

which is polymerizable by peroxy compounds, the step which comprises conducting the polymerization of said compound in the presence of a peroxydicarbonate ester at a temperature of 0 to 60° C.

12. In the preparation of a polymer by catalytic polymerization of a polymerizable compound which contains the nonaromatic polymerizable group

which is polymerizable by peroxy compounds, the step which comprises conducting the polymerization of said compound in the presence of a peroxydicarbonate ester at a temperature of 0 to 60° C. until a solid polymer is formed and thereafter further polymerizing the solid polymer at a temperature of 60 to 125° C.

FRANKLIN STRAIN.

REFERENCES CITED

The following references are of record in the file of this patent:

UNITED STATES PATENTS

| Number | Name | Date |
|---|---|---|
| 1,241,738 | Klatte et al. | Oct. 2, 1917 |

OTHER REFERENCES

Wieland et al., Annalen, vol. 446, pp. 46–47 (1926).